United States Patent [19]

Mehlitz

[11] Patent Number: 4,979,597
[45] Date of Patent: Dec. 25, 1990

[54] AIR GUIDING ARRANGEMENT FOR THE COOLING OF WHEEL BRAKES

[75] Inventor: Rainer Mehlitz, Cremlingen, Fed. Rep. of Germany

[73] Assignee: Dr. Ing. h.c.F. Porsche AG, Fed. Rep. of Germany

[21] Appl. No.: 317,914

[22] Filed: Mar. 1, 1989

[30] Foreign Application Priority Data

Mar. 5, 1988 [DE] Fed. Rep. of Germany ... 8802975[U]

[51] Int. Cl.⁵ ........................ F16D 65/78; F16D 55/02
[52] U.S. Cl. ............................... 188/264 R; 188/71.6; 188/264 AA
[58] Field of Search ................. 188/71.6, 270, 264 A, 188/264 AA, 264 R; 296/180.1, 180.5, 180.2; 180/68.1, 68.2, 68.3; 301/6 CS; 280/157; 411/338, 339, 546

[56] References Cited

U.S. PATENT DOCUMENTS

| 1,485,571 | 3/1924 | Stevens | 411/339 X |
| 4,060,142 | 11/1977 | Abe | 180/68.1 |
| 4,317,508 | 3/1982 | Katagiri et al. | |
| 4,772,299 | 9/1988 | Bogusz | 188/76.6 X |
| 4,778,321 | 10/1988 | Okawa | 411/546 X |
| 4,805,747 | 2/1989 | Moedinger et al. | 188/71.6 X |
| 4,810,021 | 3/1989 | Burst | 296/180.1 |

FOREIGN PATENT DOCUMENTS

| 2830450 | 2/1979 | Fed. Rep. of Germany . |
| 3107692 | 9/1982 | Fed. Rep. of Germany . |
| 3525672 | 3/1986 | Fed. Rep. of Germany . |
| 2074265 | 10/1981 | United Kingdom . |

Primary Examiner—Robert J. Oberleitner
Attorney, Agent, or Firm—Evenson, Wands, Edwards, Lenahan & McKeown

[57] ABSTRACT

A fastening structure for an air guiding arrangement for cooling a wheel brake of a motor vehicle having a wheel suspension link is disclosed wherein a profiled deflecting element for guiding air flow to the brake is attached to the wheel suspension link. Projections are provided for supporting the deflecting element at the wheel suspension link as well as fastening elements for fastening the deflecting element to the wheel suspension link.

7 Claims, 1 Drawing Sheet

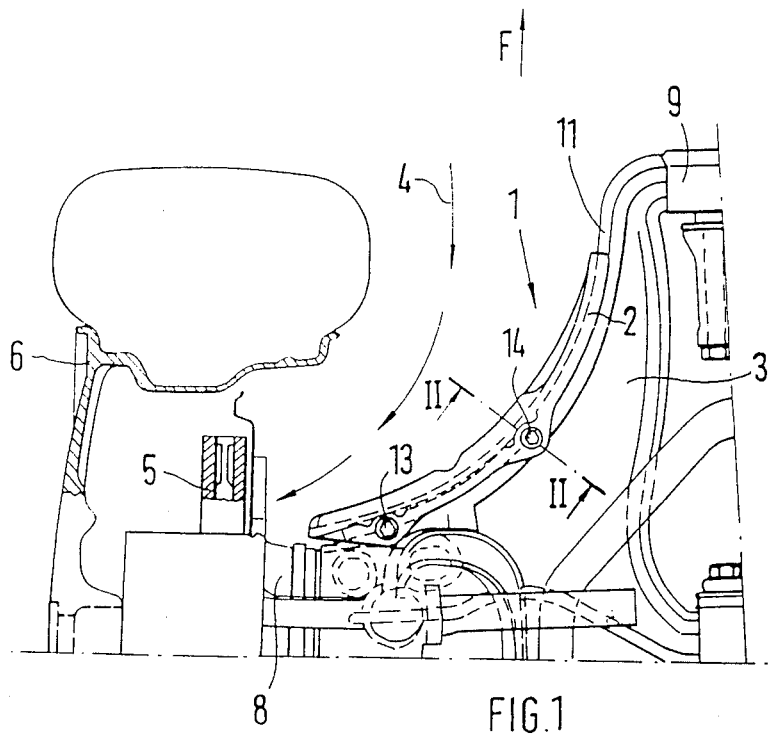
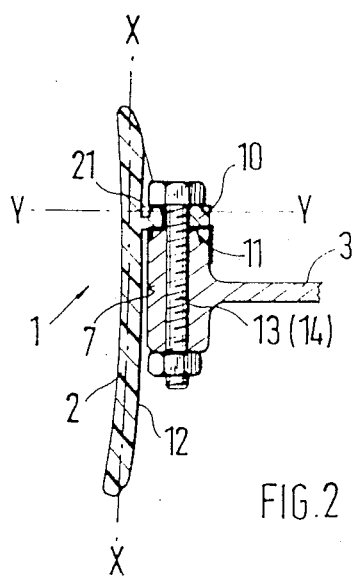
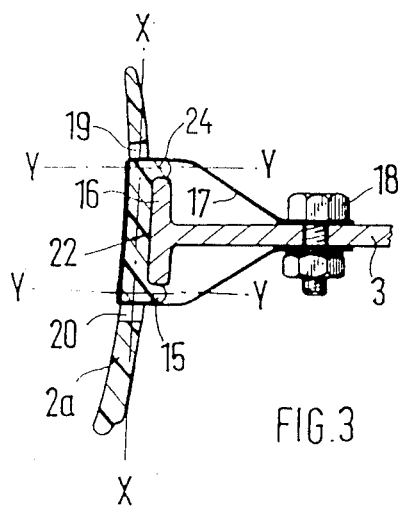

AIR GUIDING ARRANGEMENT FOR THE COOLING OF WHEEL BRAKES

BACKGROUND AND SUMMARY OF THE INVENTION

The present invention generally relates to an air guiding arrangement for cooling the wheel brakes of a motor vehicle and more particularly to an arrangement for supporting and fastening an air deflecting element at a wheel suspension link close to the wheel brake.

From DE-OS 35 25 627, an air guiding arrangement for wheel brakes is known which, at the underside of the vehicle, comprises a channel-type air inlet having an air guiding profile, a front spoiler and a deflecting element. This element, assigned directly to the wheel, is fastened at the link, is provided close to the brake and has the purpose of guiding the arriving air flow or air stream to the brake and thus causing a cooling.

It is an object of the present invention to provide an arrangement for securing a deflecting element of an air guiding arrangement which deflects cooling air to wheel brakes of a motor vehicle.

It is another object of the present invention to provide a deflecting element which, in an easy manner, can be fastened or exchanged at a wheel suspension link close to the brake.

According to the invention, these and other objects are achieved by a supporting arrangement for supporting the deflecting element at the wheel suspension link and by fastening elements for fastening the deflecting element with the wheel suspension link.

The main advantages achieved by the present invention are that the deflecting element can be connected with the link in a simple manner. For this purpose, supporting elements are molded to or integral with the deflecting element, which is made, for example, of an elastic material, and support the element in an exact position at the link. The supporting elements, together with the connecting rear surface of the deflecting element, form a support base at the contact area of the link, so that a shifting of the deflecting element caused by the forces of the air cannot take place and a secure hold is ensured.

According to an embodiment of the present invention the supporting elements comprise a single projection extending along at least a portion of the rear of the deflecting element, which is fastening at the link by screws, which penetrate both the projection and suspension link preferably from above.

According to another embodiment of the present invention the supporting elements comprise two projections, which reach over the suspension link from above and below, a bow being provided for fastening the deflecting element at the link, which encloses the projections and can be connected with the link by screws.

These connections of the deflecting element with the link are designed to be such that a mounting, even subsequently, or an exchange can take place without any significant expenditures.

Other objects, advantages and novel features of the present invention will become apparent from the following detailed description of the invention when considered in conjunction with the accompanying drawings.

BRIEF DESCRIPTION OF THE DRAWINGS

FIG. 1 is a top view of a deflecting element, which is fastening to a wheel suspension link and has one projection according to one embodiment of the present invention;

FIG. 2 is a sectional view of the deflecting element held at the link according to Line II—II of FIG. 1; and FIG. 3 is a sectional view of another embodiment of a deflecting element, which is held at the link and has two projections.

DETAILED DESCRIPTION OF THE DRAWING

Embodiments of the invention are shown in the drawing and will be described in detail in the following.

The air guiding arrangement 1 comprises essentially a profiled deflecting element 2, which is connected with a wheel suspension link 3 and is adjusted in the air stream in such a manner that the arriving air stream 4 is deflected to a brake 5 arranged in the rim 6, as shown in detail by the arrows in FIG. 1.

The deflecting element 2—with respect to the forward driving direction F of the vehicle—is arranged at the front surface 7 of the link 3. It is aligned in an approximately vertical plane X—X and extends along the arcuately shaped edge 7 of the link 3 in an approximately horizontal plane Y—Y approximately from the wheel carrier 8 to approximately a front link bearing 9.

According to the first embodiment of the deflecting element 2, according to FIGS. 1 and 2, the deflecting element 2 has a projection 10, which extends in a horizontal plane Y—Y and supports itself at a corresponding link surface 11. Preferably, the projection 10 extends over the whole length of the deflecting element 2, although it is also possible that several projections are provided in segmented fashion along the rear of the deflecting element 2. In particular, these projections will then be arranged at the fastening points to the link 3.

Projection 10, with a rear surface 12, which is located opposite the link surface 11, forms a rectangular contact surface to the link.

A fastening of the deflecting element 2 to the link 3 takes place by means of fastening screws 13, 14, which are arranged at a distance and penetrate the projection 10 as well as the link 3 and are checked at it. In order to prevent a tearing-out of the receiving bore for the fastening screws 13, 14, one sheet metal tube 21 respectively is provided in the bore and is dug into the projection 10.

According to another embodiment of the invention, according to FIG. 3, two projections 24 and 15, which reach around the edge area of the link 3, are provided at the deflecting element 2a. Each of these extend in horizontal planes Y—Y and reach over the link 2 from above and below and form a receiving device 22, which a has a U-shaped cross-section and in which a web 16 of the link 3 is held.

For the fastening of the deflecting element 2a at the link 3, bows 17 are provided, which reach over the projections 24, 15, from the front—with respect to the forward driving direction F of the vehicle—and at the end face can be fastened to the link 3 by means of screws 18. For the guiding-through of the bow 17, the deflecting element 2a has two through-put openings 19 and 20 which are put through directly above the projection 24 and below the other projection 15 in the deflecting element 2a.

Preferably, several of such bows 17 for the holding of the deflecting element 2 are fastened at the link 3, the two projections 24, 15 extending preferably over the whole length of the deflecting element 2; however, a plurality of projections 24, 15 in segment fashion are also contemplated by the invention.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An air guiding arrangement for the cooling of a wheel brake of a motor vehicle having a wheel suspension link comprising:
   (a) a profiled deflecting element having a front and a rear surface with respect to the forward driving direction of the vehicle and adjusted against arriving air flow for guiding the air flow to the brake;
   (b) supporting means for supporting the deflecting element in an exact position at the wheel suspension link, the supporting means comprising a projection, formed at the rear surface of the deflecting element, which reaches over the link from above and, with the rear surface of the deflection element, forms a substantially rectangular contact surface with respect to the link;
   (c) fastening means for fastening the deflecting element to the wheel suspension link, the fastening means comprising fastening screws which are arranged at a distance from one another and penetrate the link, each of the fastening screws being respectively arranged in receiving bores of the projection; and
   (d) one sheet metal tube respectively arranged in each of the receiving bores of the projection for the fastening screws, each of the sheet metal tubes being dug into the projection.

2. An arrangement for the cooling of a wheel brake of a motor vehicle having a wheel supported at a wheel carrier and a suspension link suspending the wheel carrier at a vehicle frame, comprising:
   (a) a profiled deflecting element having a front and a rear surface with respect to the forward driving direction of the vehicle and adjusted against arriving air flow for guiding the air flow to the brake;
   (b) supporting means for supporting the deflecting element in an exact position at the wheel suspension line, the supporting means comprising two projections which reach over the link from above and below and form a receiving device which is U-shaped in its cross-section; and
   (c) fastening means for fastening the deflecting element to the wheel suspension link.

3. An arrangement according to claim 2, wherein the U-shaped receiving device is enclosed by a bow which, at its end, is connected with the link by means of fastening screws.

4. An arrangement according to claim 3, wherein the deflecting element has through-put openings for the bow, which, in a form-fitting manner, reaches around the projections and around an area between the projections.

5. An arrangement according to claim 2, wherein the U-shaped receiving device is disposed immediately adjacent the profiled deflecting element along a substantial portion of the length of the deflecting element.

6. An arrangement for the cooling of a wheel brake of a motor vehicle having a wheel suspension link, comprising:
   (a) a profiled deflecting element having a front and a rear surface with respect to the forward driving direction of the vehicle and adjusted against arriving air flow for guiding the air-flow to the brake;
   (b) supporting means for supporting the deflecting element in an exact position at the wheel suspension link, the supporting means comprising two projections which reach over the link from above and below and form a receiving device which is U-shaped in its cross-section; and
   (c) fastening means for fastening the deflecting element to the wheel suspension link, wherein the U-shaped receiving device is enclosed by a bow which, at its end, is connected with the link by means of fastening screws.

7. An arrangement according to claim 6, wherein the deflecting element has through-put openings for the bow, which, in a form-fitting manner, reaches around the projections and around an area between the projections.

* * * * *